United States Patent [19]

Koboshi et al.

[11] Patent Number: 5,004,522

[45] Date of Patent: Apr. 2, 1991

[54] METHOD OF TREATING PHOTOGRAPHIC PROCESS WASTE LIQUOR THROUGH CONCENTRATION BY EVAPORATION

[75] Inventors: Shigeharu Koboshi; Kazuhiro Kobayashi; Nobutaka Goto; Masayuki Kurematsu; Naoki Takabayashi, all of Hino, Japan

[73] Assignee: Konica Corporation, Tokyo, Japan

[21] Appl. No.: 453,014

[22] Filed: Dec. 20, 1989

Related U.S. Application Data

[63] Continuation of Ser. No. 126,213, Nov. 27, 1987, abandoned.

[30] Foreign Application Priority Data

Dec. 3, 1986 [JP] Japan ................................ 61-288328

[51] Int. Cl.$^5$ ................................................ B01D 1/00

[52] U.S. Cl. ................................ 159/47.003; 159/29; 159/43.1; 203/1; 203/2; 203/100; 203/DIG. 11; 203/DIG. 25; 354/299

[58] Field of Search ........................ 159/47.3, 29, 43.1; 203/1, 2, 100, DIG. 11, DIG. 25; 354/299, 324

[56] References Cited

U.S. PATENT DOCUMENTS

| | | | |
|---|---|---|---|
| 3,147,687 | 9/1964 | Halden | 354/299 |
| 3,449,220 | 6/1969 | Geisler et al. | 203/DIG. 14 |
| 3,733,994 | 5/1973 | Armstrong et al. | 354/324 |
| 3,869,383 | 3/1975 | Shimamura et al. . | |
| 3,891,495 | 6/1975 | Baird | 159/6.3 |
| 3,995,298 | 11/1976 | Vandeputte et al. | 354/324 |
| 4,043,907 | 8/1977 | Shimamura et al. . | |
| 4,062,031 | 12/1977 | Schröter | 354/299 |
| 4,073,705 | 2/1978 | Torikai et al. . | |
| 4,101,918 | 7/1978 | Schröter | 354/299 |
| 4,135,803 | 1/1979 | Van Houwelingen | 354/299 |
| 4,319,826 | 3/1982 | Bussche et al. | 354/299 |
| 4,341,599 | 7/1982 | Watson et al. | 202/176 |
| 4,421,399 | 12/1983 | Steube | 354/299 |

FOREIGN PATENT DOCUMENTS

| | | | |
|---|---|---|---|
| 0223605 | 5/1987 | European Pat. Off. . | |
| 48-84462 | 11/1973 | Japan . | |
| 49-58833 | 6/1974 | Japan . | |
| 49-64257 | 6/1974 | Japan . | |
| 51-89347 | 8/1974 | Japan . | |
| 49-119457 | 11/1974 | Japan . | |
| 49-119458 | 11/1974 | Japan . | |
| 50-22463 | 3/1975 | Japan . | |
| 51-7952 | 3/1976 | Japan . | |
| 51-12943 | 4/1976 | Japan . | |
| 51-37704 | 10/1976 | Japan . | |
| 53-383 | 1/1978 | Japan . | |
| 53-12152 | 2/1978 | Japan . | |
| 53-63763 | 6/1978 | Japan . | |
| 53-43271 | 11/1978 | Japan . | |
| 53-43478 | 11/1978 | Japan . | |
| 56-33996 | 8/1981 | Japan . | |
| 57-37395 | 8/1982 | Japan . | |
| 57-37396 | 8/1982 | Japan . | |
| 60-70841 | 5/1985 | Japan . | |
| 0216349 | 10/1985 | Japan | 354/299 |

OTHER PUBLICATIONS

Weissberger et al., "Technique of Organic Chemistry", vol. IV, Distillation, pp. 348-352.

Patent Abstracts of Japan, vol. 11, No. 335 (p-632)[2782], Nov. 4th, 1987; & JP-A-62 118 346 (Konishiroku Photo Ind. Co. Ltd.), 29-05-1987.

*Primary Examiner*—Virginia Manoharan
*Attorney, Agent, or Firm*—Frishauf, Holtz, Goodman & Woodward

[57] ABSTRACT

A method of treating photographic process waste liquor through concentration by evaporation, including heating an upper part of photographic process waste liquor to concentrate by evaporation the photographic process waste liquor in such a manner that the difference between the temperature of the photographic process waste liquor in the vicinity of the heated part and the temperature at a bottom part of the photographic process waste liquor may become 5° C. or more, and causing a solute in the photographic process waste liquor to settle.

5 Claims, 8 Drawing Sheets

METHOD OF TREATING PHOTOGRAPHIC PROCESS WASTE LIQUOR THROUGH CONCENTRATION BY EVAPORATION

This application is a continuation of application Ser. No. 126,213, filed Nov. 27, 1987 (now abandoned).

BACKGROUND OF THE INVENTION

This invention relates to a method of, and an apparatus for, treating photographic process waste liquor through concentration by evaporation, and particularly to a method of, and an apparatus for, photographic process waste liquor through concentration by evaporation, that is suited for treating waste liquor produced along with development processing of light-sensitive photographic materials using an automatic processing machine, inside the automatic processing machine or in the vicinity thereof without need of collection by dealers.

In general, in the case of black and white light-sensitive photographic materials, the photographic processing of light-sensitive silver halide photographic materials is carried out with steps comprising developing, fixing, washing, etc. and in the case of light-sensitive color photographic materials, with steps comprising color developing, bleach-fixing (or bleaching and fixing), washing, stabilizing, etc.

Then, in the photographic processing for a large quantity of light-sensitive materials, there is employed a means in which the performance of processing solutions is constantly maintained by removing, while replenishing components consumed by the processing, components that may be concentrated during the processing by dissolving-out in the processing solution or by evaporation (for example, bromide ions in the developing solution, silver ions in the fixing solution, etc.). A replenishing solution is supplied for the purpose of the above replenishing, and a part of the processing solution is thrown away for the purpose of removing the above concentrated components in the photographic processing.

Recent years, because of environmental pollution or for economical reasons, the processing solutions and washing water as well are undergoing a change such that they are used in a system in which the quantity of the replenishment has been greatly decreased. The photographic process waste liquor is led from a processing tank of the automatic processing machine through a waste liquor pipe and thrown away in sewerages or the like after diluted with waste liquor of washing water or cooling water for the automatic processing machine.

However, because of tightened control in recent years against the environmental pollution, although it is possible to throw away washing water or cooling water in sewerages or rivers, it has been made substantially impossible to throw away the photographic processing solutions other than these [for example, developing solutions, fixing solutions, color-developing solutions, bleach-fixing solutions (or bleaching solutions or fixing solutions), stabilizing solutions, etc.]. Known methods for pollution-preventive treatment to decrease the burden to environmental pollution by photographic process waste liquor include, for example, an activated sludge method (Japanese Patent Publications No. 7952/1976, No. 12943/1976, etc.), an evaporation method (Japanese Unexamined Patent Publication No. 89437/1974, Japanese Patent Publication No. 33996/1981, etc.), an electrolytic oxidation method (Japanese Unexamined Patent Publications No. 84462/1973, No. 119457/1974 and No. 119458/1974, Japanese Patent Publication No. 43478/1978, etc.), an ion-exchange method (Japanese Patent Publications No. 37704/1976 and No. 43271/1978, Japanese Unexamined Patent Publication No. 383/1978, etc.), a reverse osmosis method (Japanese Unexamined Patent Publication No. 22463/1975, etc.), a chemical treatment method (Japanese Unexamined Patent Publications No. 64257/1974, No. 12152/1978, No. 58833/1974 and No. 63763/1978, Japanese Patent Publications No. 37395/1982 and No. 37396/1982, etc.), etc. which, however, can not be said to be sufficient. Accordingly, in general, the waste liquor is collected by waste liquor collecting dealers, and made harmless after secondary and tertiary treatments. However, because of increase in the cost for the collection, not only the fees for taking over the waste liquor is increasing year by year, but also the dealers are not willing to come to miniature photofinishing laboratories to collect the waste liquor because of its low collection efficiency, thus causing problems such that shops are full of waste liquor.

On the other hand, for the purpose of solving these problems and with an aim at making it possible to readily carry out the treatment of the photographic process waste liquor also in the miniature photofinishing laboratories, it is studied to heat the photographic process waste liquor to carry out evaporation of water to dryness or effect solidification as disclosed, for example, in Japanese Utility Model Unexamined Publication No. 70841/1985. As known in the studies by the inventors, harmful or very ill-smelled gases such as sulfite gas, hydrogen sulfide and ammonia gas may generate when the photographic process waste liquor is subjected to the evaporation treatment. These were found to be generated because ammonium thiosulfate and sulfites (ammonium salt, sodium salt or potassium salt) frequently used as the fixing solution or bleach-fixing solution of the photographic processing solutions are decomposed owing to high temperature. Moreover, at the time of the evaporation treatment, the water or the like contained in the photographic process waste liquor is vaporized in the form of vapor to increase the volume and increase the pressure in a evaporating vessel. Therefore, because of this pressure, the above harmful or ill-smelled gases may necessarily leak outside the evaporation treatment apparatus to cause great difficulties from a viewpoint of the work environment.

Now, to solve these problems, Japanese Utility Model Unexamined Publication No. 70841/1985 discloses a method in which an exhaust gas treating section comprising activated carbon or the like is provided at an exhaust pipe section of the evaporation treatment apparatus. This method, however, has a serious disadvantage that the vapor from a large quantity of water contained in the photographic process waste liquor causes sweating or moisture condensation at the exhaust gas treating section, so that a gas absorption treatment agent is covered with the water to instantaneously lose its gas absorption ability. Thus, this method has not been put into practical use.

To solve these problems, the present applicants have previously proposed a method of, and an apparatus for, treating photographic process waste liquor, in which when the evaporation treatment of photographic process waste liquor is carried out, a heat exchange means capable of condensing the vapor generated by the evaporation is provided and further the condensate water generated by condensation and also uncondensed components are treated, to discharge them to the outside.

However, there were found the following problems in the above proposal. Specifically, the vapor generated by evaporation treatment, which is condensed by the heat exchange means, may leak outside the apparatus before the vapor is led to the heat exchange means with good efficiency because of the pressure increased in the evaporating vessel at the time of the evaporation treatment. Since in such vapor the particularly ill-smelled harmful gas such as hydrogen sulfide is contained, this is not preferable from viewpoints of social environment and labor environment. Also, the uncondensed components having passed through the heat exchange means are discharged outside after they are treated by activated carbon or the like, but in this treatment, it is particularly difficult to remove sufficiently the ill-smelled gas and also the activated carbon may immediately lose its ability. Thus, there is a danger that such gas is discharged outside as it is. Still also, it has been revealed that when the waste liquor is treated by evaporation, there may occur the phenomenon of bumping as the waste liquor in the evaporating vessel is more concentrated, to cause the waste liquor to be scattered on the inner wall of the apparatus and fixed on the inner wall, resulting in troubles to impair the functions of the apparatus (for example, corrosion, drive failure, etc.).

SUMMARY OF THE INVENTION

This invention has been made taking account of the above problems conventionally involved in the art, and a first object of this invention is to provide a method of, and an apparatus for, treating photographic process waste liquor through concentration by evaporation according to an evaporation treatment that can decrease the harmful or ill-smelled components generated by evaporation treatment of photographic process waste liquor and is free from concentration at an evaporating section even if a concentration treatment is continuously carried out, thus hardly causing any accidents such as bumping. A second object of this invention is to provide a method of, and an apparatus for, treating photographic process waste liquor through concentration by evaporation, that can achieve good thermal efficiency, can achieve good evaporation efficiency, can reduce energy cost and can make an apparatus compact. A third object of this invention is to provide a method of, and an apparatus for, treating photographic process waste liquor through concentration by evaporation, that may cause less bumping at the time of the evaporation treatment. A fourth object of this invention is to provide a method of, and an apparatus for, treating photographic process waste liquor through concentration by evaporation, that can achieve a very great concentration degree of the residues concentrated to dryness by the evaporation and may give only a small amount of water contained in wastes (sludge), thus being easy to handle.

To solve the above problems, a first invention provides a method of treating photographic process waste liquor through concentration by evaporation, comprising heating an upper part of photographic process waste liquor to concentrate by evaporation the photographic process waste liquor in such a manner that the difference between the temperature of the photographic process waste liquor in the vicinity of the heated part and the temperature at a bottom part of the photographic process waste liquor may become 5° C. or more, and causing a solute in the photographic process waste liquor to settle. A second invention provides an apparatus for treating photographic process waste liquor through concentration by evaporation, comprising an evaporating vessel, and a heating means for heating an upper part of photographic process waste liquor in such a manner that the difference between the temperature of the photographic process waste liquor in the vicinity of the heated part and the temperature at a bottom part of the photographic process waste liquor may become 5° C. or more.

DESCRIPTION OF THE PREFERRED EMBODIMENTS

Figure 1:
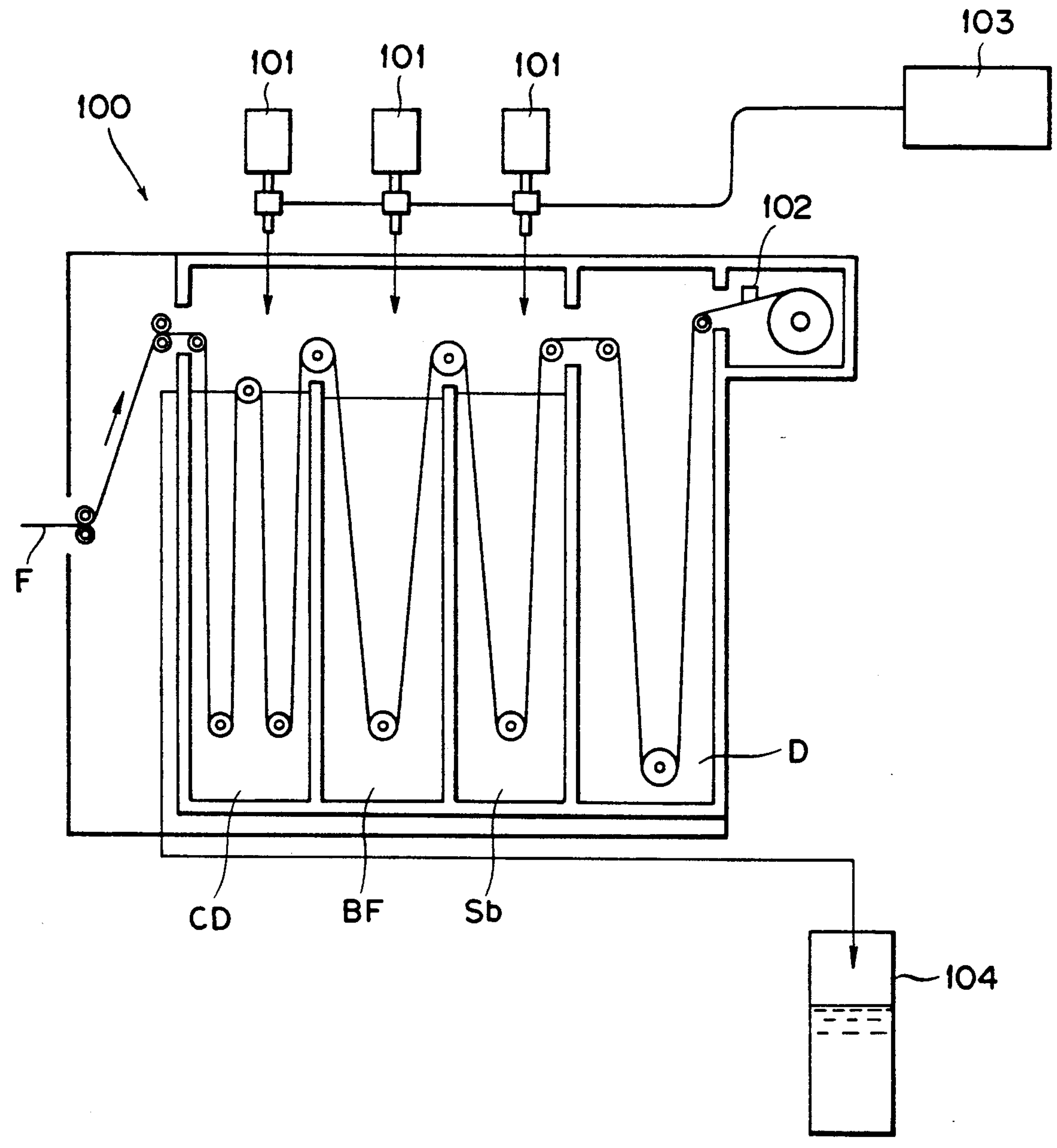
FIG. 1 is a schematic illustration of an automatic processing machine.

At a stage in which the solute begins to settle, the temperature at the bottom part of the photographic process waste liquor refers to the temperature in the vicinity being in contact with the bottom of the evaporating vessel, and, when settlings are present after settling begins, it refers to the temperature in the vicinity of the interface between the settlings of solute and the photographic process waste liquor.

The effect of this invention can be obtained by the evaporation treatment that can cause dehydration reaction to automatically occur in the photographic process waste liquor while preventing the generation of ammonia gas, sulfite gas, hydrogen sulfide, etc. which may be generated because of the heating and evaporating of ammonium thiosulfate and ammonium sulfite or their corresponding sodium salts and potassium salts present in the liquor, and makes it possible to settle these compounds to remove them outside the system.

The object of this invention can be achieved by heating the liquor at an upper part of the evaporating vessel, and providing a section in which the concentrated liquor goes down to a lower part, while the evaporation is effected. In particular, a condition to be made is that a temperature difference of 5° C. or more between the liquors at the upper part and lower part of the evaporating vessel may be caused. Desirable structure of the evaporating vessel is such that a temperature difference of 10° C. or more may preferably take place.

As the evaporation proceeds, the concentrated photographic process waste liquor having a greater gravity goes down to the lower part, and the upper part turns to be comprised of thin waste liquor. This makes low the concentration of solute at a higher temperature part corresponding to the heated part, and can greatly suppress the generation of rank odor and gas owing to thermal decomposition. In addition, at the lower part of the evaporating vessel, the concentration of the solute (compounds) is hightened to make the settling to be readily caused and at the same time make the generation of gas to be readily accompanied owing to the thermal decomposition caused by heating. However, the temperature at that part can be made far lower than that at the upper part of the evaporating vessel at which the evaporation takes place. Thus, the compounds may naturally deposit without thermal decomposition thereof and only causing the dehydration reaction, to begin to spontaneously settle toward the bottom of the evaporating vessel. Once the settling begins, the settling takes place continuously and the compounds are accumulated at the lower part even when the photographic process waste liquor is additionally supplied from the upper part in an amount corresponding to the amount decreased by the evaporation. Moreover, the settlings begin to become solidified at the bottommost part of the evaporating vessel with lapse of time, resulting in an increase in the density.

In an evaporation treatment using the conventional simple evaporating vessel having no difference in the distribution of concentration between the upper part and lower part, the liquor is set to sludge when it is concentrated to about 1/15 of initial waste liquor, making it difficult to cause the evaporation of water more than that. However, in the evaporation deposition system of this invention, the liquor can be concentrated to 1/20 to 1/30 of initial waste liquor.

This phenomenon can be presumed to be the superconcentration attributable to the dehydration reaction spontaneously caused by the compounds themselves in a method to carry out the concentration slowly at a low temperature and bring away water content to an upper part. In usual evaporation, it can be presumed that the evaporation to dryness may take place so rapidly that the internal water content can be removed only with extreme difficulty once the liquor is turned to sludge, and the volume of the sludge may not decrease. In the method of this invention, it was proved that the concentration of solute components at the high temperature part heated for evaporation is so low that the boiling point may not be readily caused to rise and the evaporation can be effected in a very good efficiency. In the conventional vessels used in the evaporation to dryness, as the concentration gradually increases with approaching to sludge state, the boiling point is caused to rise, resulting in a lowering of the evaporation efficiency. The increase in the viscosity and the bumping have also been liable to occur in the conventional vessels, but in this invention, it was reveled that the concentration of the waste liquor at the evaporating part is so low that the bumping may very hardly occur.

The temperature difference required in this invention is preferably at least 5° C., more preferably 10° C. or more, and particularly preferably 30° C. or more. If feasible on account of the apparatus, a more desirable embodiment is such that the temperature difference is 40° C. or more, or 50° C. or more. The greater the temperature difference is, the more effectively the effect of this invention can be exhibited. Namely, the difference in the solute concentration between the upper part and lower part of the evaporating vessel becomes greater, and the evaporation efficiency can be improved at the evaporating part. Also, there can be generated less rank odor and harmful gas, and still also the deposit of settlings may readily occur at the lower part having a low temperature, of the evaporating vessel.

Moreover, in the evaporation process of this invention, the sludge may be naturally settled to the lower part of the evaporating vessel. Accordingly, in a preferred example, the settlings are continuously taken out from the lower part of the evaporating vessel and thereby the photographic process waste liquor can be automatically fed from the upper part, so that a continuous evaporation treatment can be carried out semipermanently.

The settlings may be continuously taken out by means of an endless belt, or taken out by means of a rotatable spiral sleeve or by any other means.

In general, it is desirable to take out the settlings at the bottom part of the evaporating vessel according to a batch system after a given quantity of photographic process waste liquor has been treated. Also, as one of remarkable features of this invention, the temperature at the lower part of the evaporating vessel is so low that the settlings can be taken out during drive without any danger and without rank order or harmful gas, therby extremely safe driving can be conducted.

In the evaporating vessel used in this invention, the photographic process waste liquor heated by a heating means provided at the upper part is concentrated, and thus concentrated thick liquor goes down to the lower part. Accordingly, the evaporating vessel necessarily requires a distance from the heating means to the bottom part of the photographic process waste liquor.

The longer the above distance is, the more preferably the temperature difference can be produced to cause the difference in concentration of solute between the heated part and the settling part, but, although not unconditionally determinable as it depends on the shape of the evaporating vessel or the volume of the heating means, it may be found in advance by experimental approach. The photographic process waste liquor may preferably be fed from an upper part of the evaporating vessel.

In this invention, the photographic process waste liquor may preferably be fed depending on the amount of evaporation. In specific instances, the quantity of evaporated and condensate water may be detected or the variation in the quantity of the liquor in the evaporating vessel may be detected. Means for detecting the liquor quantity include means for detecting the weight of the liquid, a liquid level, etc. Among the means for detecting the liquid level, particularly preferred is a means for detecting the liquid level in the evaporating vessel.

Figure 13:
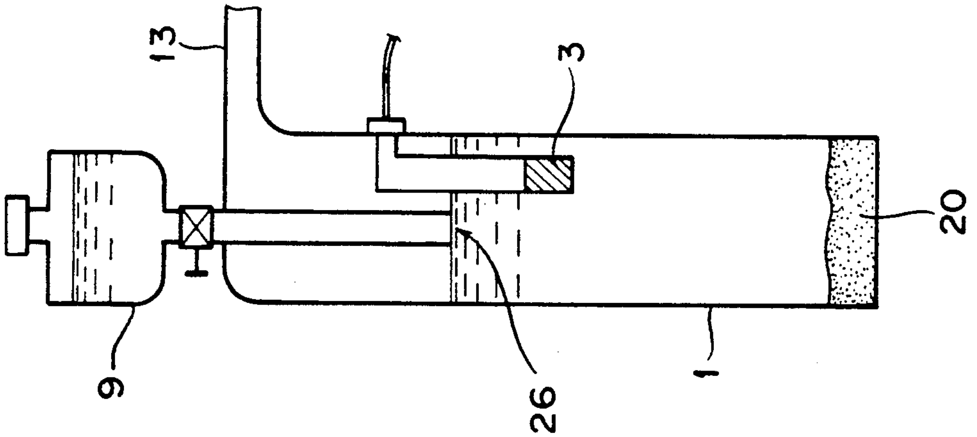

As another embodiment, particularly preferred is a system in which the waste liquor is automatically fed in an amount corresponding to the amount decreased by evaporation, according to a bird water-drinking system as shown in FIG. 13, from an external hole 26 connecting through the liquid level in the evaporating vessel. This is preferred as a simple continuous treatment system, because it requires no equipment such as the means for detecting the liquid level and thus an inexpensive and simple apparatus can be constituted as the apparatus.

The heating means of this invention includes a heating means disposed at the outside of the evaporating vessel for holding the photographic process waste liquor, or a heating means immersed in the photographic process waste liquor held in the evaporating vessel. The heating means disposed at the outside may include, for example, a far-infrared heater, a hot air type heater, a quartz-sheathed element heater, a pipe heater, a ceramic heater, a plate heater, etc. However, from a viewpoint of the evaporation efficiency, particularly preferred is a direct heating system that can directly heat the waste liquor as a whole at the inside of the evaporating vessel. In this instance, the heater may preferably be a heater sheathed with a material whose surface may not be damaged by the photographic process waste liquor (for example, SUS 316 stainless steel, titanium steel, Hastelloy C, quartz sheath, glass, etc.). These heating means may preferably be provided with a means for preventing liquid-empty heating with use of an overheat preventing temperature controller.

Figure 9:
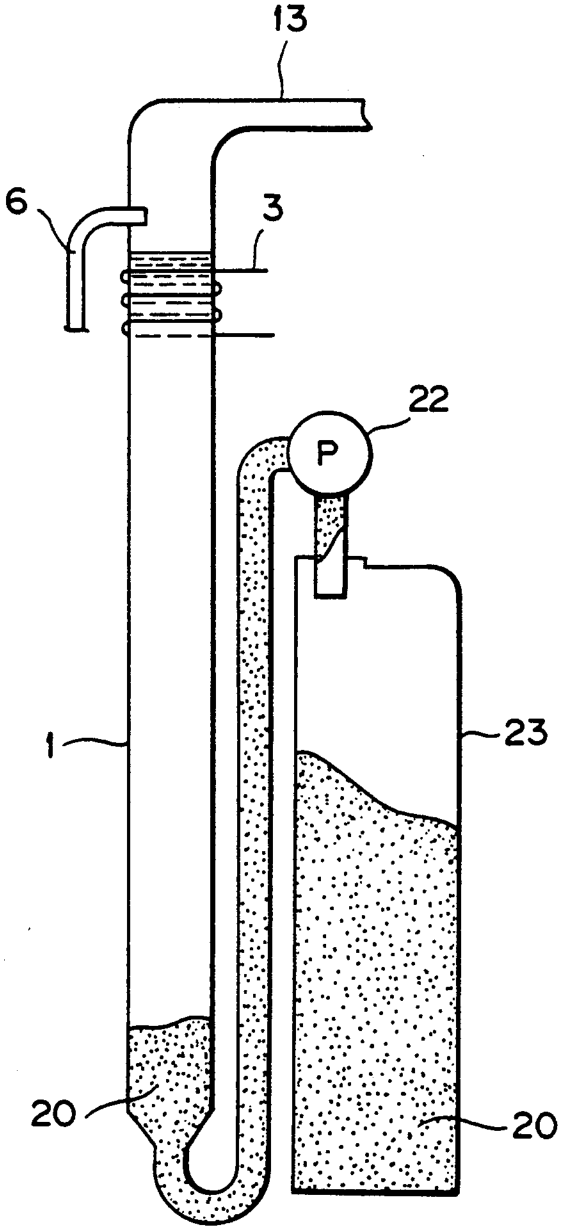

The evaporating vessel may preferably be separated into the upper and lower parts and a settlings-depositing chamber so that the settlings can be taken out during drive. Particularly preferred is a type in which the upper and lower parts of the evaporating vessel can be separated from the settlings-depositing chamber by means of a ball valve or a solenoid valve so that the settlings can be taken out from a lower part during drive. However, still particularly preferred is a type in which, as shown in FIG. 9, the settlings can be continuously taken out from a pipe section of the evaporating vessel, having a shape of U-tube and containing no heater.

Constructing the apparatus in the above manner, the evaporation treatment of the photographic process waste liquor can be continuously carried out, making it possible for users to treat the photographic process waste liquor in a very high efficiency and with simplicity.

In this invention, as a working embodiment of the treatment by the batch process, the means for taking out the settlings comprises taking out them in a bag for discharge of settlings or a screw joint type or instantly detachable type polyethylene bottle provided at a lower part of the evaporating chamber, and then they can be thrown away. These bag and bottle may preferably be made of an organic resin endurable to a temperature of about 20° C. to 90° C., and there can be used nylon 6,5 type, nylon 6,6 type, polyamide type, vinyl chloride type or polyethylene type resin.

Figure 2:
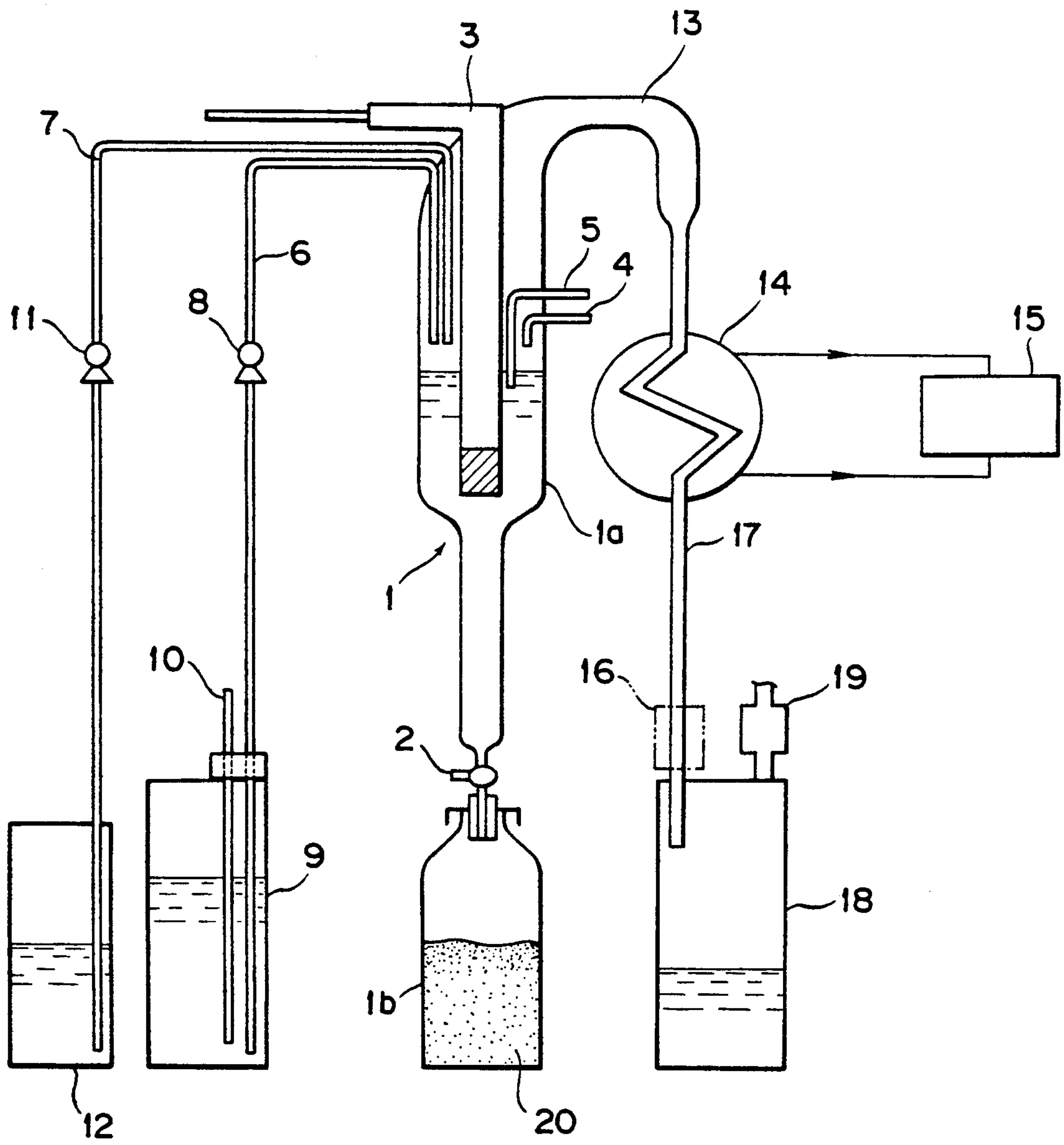
FIG. 2 is a schematic illustration showing an example of this invention.

As a preferred working embodiment of this invention, as shown, for example, in FIG. 2, the vapor generated by evaporation may preferably be cooled and thereafter discharged outside through a gas treating column connected to the open air. This makes it possible to prevent the harmful gas from being vaporized to leak outside the vessel because of the decomposition slightly occurring in the photographic process waste liquor during the evaporation treatment, or prevent the harmful gas being made liable to leak because of the evaporating vessel that may otherwise be brought into a pressurized state. Moreover, when the treatment apparatus is stopped, the evaporating vessel may be brought into a vacuum state or pressure-reduced state because of the contraction of the vapor or gas expanded by heating in the inside of the vessel, and thus it is liable that the evaporating vessel breaks owing to the negative pressure when the vessel is in a perfectly closed state. The above gas treating column makes it possible to prevent these by introducing the open air from the outside. In the gas treating column, adsorbents or deodorizers including, for example, activated carbon, zeolite, etc. may be used. These adsorbents or deodorizers are required to have a property of passing a gas, and therefore may preferably in the form of grains, including those having a grain size of 0.3 mm to 15 mm. Particularly preferred adsorbents or deodorizers are those having a grain size of 0.8 mm to 6 mm.

Granular activated carbon may also preferably be used in this invention in view of its economical advantages and handling properties. Example of the granular activated carbon may include granular activated carbon available from Toyo Calgon K.K. (BPL, PCB, FILTRASORB 400, CANECAL, CAL, CPG, SGL, FILTRASORB 300, APC, IVP, HGR, CP-4, FCA), granular activated carbon available from Norit Japan Co., Ltd. (PK, RO, ROW, R-20, PB, R, R. Extra, Sorbonorit, SX, SA, PN, ZN, W. AZO, CA, CN) or granular activated carbon (SHIRASAGI series) available from Takeda Chemical Industries, Ltd.

Examples of the deodorizers may include Daimushu available from Dainippon Seika Kogyo K.K., porous fiber Anico (TRIGGER, November 1985, pp.62-63) containing iron (III)/phthalocyanine in an amount of several % (1 to 10 Wt.%).

As a result of various studies, the present inventors found that a trace harmful gas generated when the photographic process waste liquor is subjected to the evaporation treatment is dissolved in the condensate water, and, in some cases, components having a great burden to environmental pollution may be mixed therein.

For example, in the case of the photographic development waste liquor, in which sulfite gas, ammonia and hydrogen sulfide gas are dissolved as mentioned above, organic solvents or organic acids such as ethylene glycol, acetic acid, diethylene glycol or benzyl alcohol turned to a gas by the azeotropy with water are flow out in the condensate water.

For this reason, the condensate water has a great burden to environmental pollution such as BOD and COD, and, in many cases, it can not be discharged as it is into sewerages or rivers. Accordingly, in this invention, oxidizing agents or pH adjusters are added in the condensate water, or, if necessary, it is preferable to use, as shown in FIG. 2 by an imaginary line, a filtering means 16 (particularly a filtering means containing activated carbon) provided at a latter stage of a section for condensing the vapor generated by evaporation.

In this invention, for example, for the purpose of decomposing the harmful gas, ozone can be fed to the inside of the filtering means or to a former stage thereof. As another means, preferably used is a means for catalytic combustion using platinum or palladium alloy in place of ozone, which means is particularly effective against ammonia gas.

In the treatment method and treatment apparatus of this invention, they are effective when the waste liquor is the photographic process waste liquor and contains a large quantity of thiosulfate, sulfite and ammonium salts, and, in particular, very effective when it contains organic ferric complex salts and thiosulfates.

As a preferred example for applying this invention, this invention is suited for treating the photographic process waste liquor produced along with the development processing of light-sensitive photographic materials with use of an automatic processing machine, in the automatic processing machine itself or in the vicinity thereof. The automatic processing machine and the photographic process waste liquor will be described below.

Automatic processing machine

In FIG. 1, the automatic processing machine is denoted by the numeral 100, and the machine shown therein is of a system in which a rolled light-sensitive photographic material F is continuously guided to a color developing tank CD, a bleach-fixing tank BF and a stabilizing tank Sb to effect photographic processing, and rolled up after drying D. The numeral 101 denotes replenishing solution tanks. The photographic processing amount of the light-sensitive photographic material F is detected by a sensor 102, and replenishing solutions are supplied in the respective processing tanks through a controlling device 103 according to the detected information.

When the replenishing solutions are supplied to the respective photographic processing tank, overflowed waste liquor is discharged from the processing tanks and collected in a stock tank 104. Simple means for transporting the overflowed photographic process waste liquor to the stock tank 104 is to allowing it to naturally drop through a guide tube. In some case, it can be forcedly transported by means of a pump or the like.

The respective photographic processing tanks CD, BF and Sb have differences in the components in the photographic process waste liquor as mentioned above, but preferred in this invention is to mix and treat in a lump all kinds of photographic process waste liquor.

Photographic process waste liquor

The photographic process waste liquor that can be treated by this invention may typically include the waste liquor produced when a light-sensitive silver halide color photographic material is processed with use of photographic processing solutions used for a light-sensitive color photography. However, the photographic process waste liquor that can be treated by this invention may not be limited to this, and may include the waste liquor produced when a light-sensitive silver halide color photographic material is processed with use of other photographic processing solutions.

Examples

FIG. 2 is a schematic illustration of an example more specifically illustrating this invention. In FIG. 2, the numeral 1 denotes an evaporating vessel, comprised of a liquid-holding section (reservoir section) 1*a* and settlings-holding section 1*b*. The liquid-holding section 1*a* and a settlings-holding section 1*b* may be shut off by a ball valve 2, and the above settlings-holding section is detachably mounted. At an upper part of the liquid-holding section 1*a*, provided is a heating means 3, and, at an upper part of this heating means, provided are an upper limit liquid level sensor 4 and a lower limit liquid level sensor 5 to prevent the liquid-empty heating in the evaporating vessel 1. A waste liquor feeding pipe 6 and an agent solution feeding pipe 7 are also provided at the upper part of the above liquid-holding section 1*a*, so that the photographic process waste liquor can be fed from a waste liquor tank 9 to the liquid-holding section 1*a* through a waste liquid feeding pipe 6 by driving a waste liquor feeding pump 8. In this waste liquor tank 9, there is provided a liquid level sensor 10 for detecting the residual quantity of the photographic process waste liquor.

Also, an agent solution feeding pump 11 is provided on the above agent solution feeding pipe 7, so that an agent solution can be fed from an agent solution tank 12 to the liquid-holding section la by driving this agent solution feeding pump 11.

To the upper part of the liquid-holding section 1*a*, a vapor discharging pipe 13 is further connected, and a condenser 14 is provided on this vapor discharging pipe 13, where the water cooled by a refrigeration machine 15 is caused to circulate. From the condenser 14, the condensate water is discharged to a condensate water tank 18 through a condensate water discharging pipe 17 equipped with a filtering means 16. At an upper part of this condensate water tank 18, provided is a gas treating column 19.

To describe an outline of the process of carrying out the heating and evaporation treatment with use of this apparatus, the photographic process waste liquor stored in the waste liquor tank 9 is fed to the liquid-holding section 1*a* of the evaporating vessel 1 through the waste liquor feeding pipe 6 by means of the waste liquor feeding pump 8 until it is detected by the upper limit liquid level sensor 4. The photographic process waste liquor contained in the liquid-holding section 1*a* is evaporated by heating with the heating means 3, but the waste liquor is again fed until it reaches the level detected by the upper limit liquid level sensor 4, at the time when the liquid level is lowered to the level detected by the lower limit liquid level sensor 5. The vapor generated by evaporation is sent to the condenser 14 through the vapor discharging pipe 13, cooled there to condense, and stored in the condensate water tank 18.

On the other hand, as the concentration proceeds, settlings 20 generated are deposited at the settlings-holding section 1*b*, and replaces the photographic process waste liquor located at the settlings-holding section 1*b*. Here, the liquid level sensor 10 in the waste liquor tank 9 detects that the waste liquor has been run short, and a notice to that effect is given by means of a warning buzzer or a warning lamp and at the same time the heating means 3 is turned off. Thus, the ball valve is closed to exchange the settlings-holding section 1*b* and at the same time exchange the waste liquor tank 9, thereafter opening the ball valve 2 to again start the concentration.

To the evaporating vessel 1, the agent solution used for the purpose of deodorization, comprising, for example, alkali agents, etc. is oprionally fed from the agent solution tank 12 through the agent solution feeding pipe 7 by driving the agent solution feeding pump 11.

Figure 5:
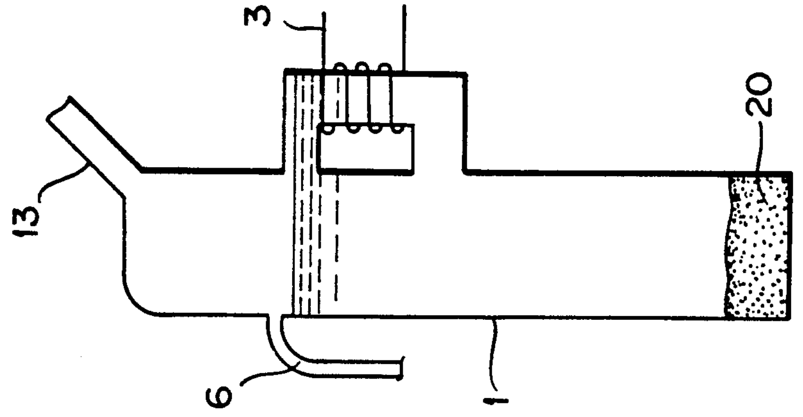
FIG. 3 to FIG. 13 are schematic illustrations showing other examples.
Figure 4:
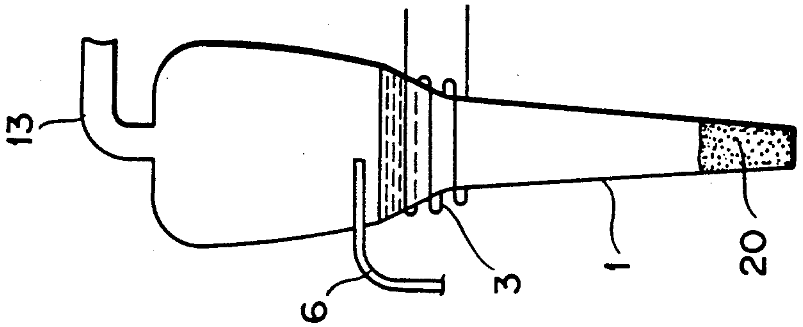
Figure 3:
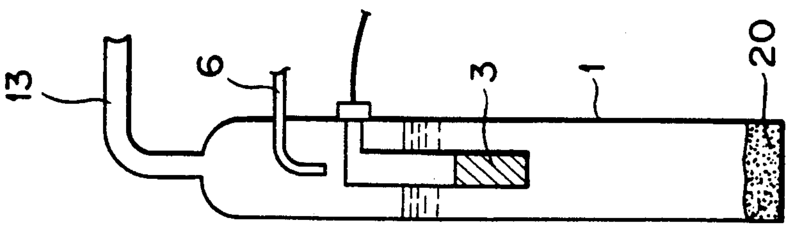
Figure 7:
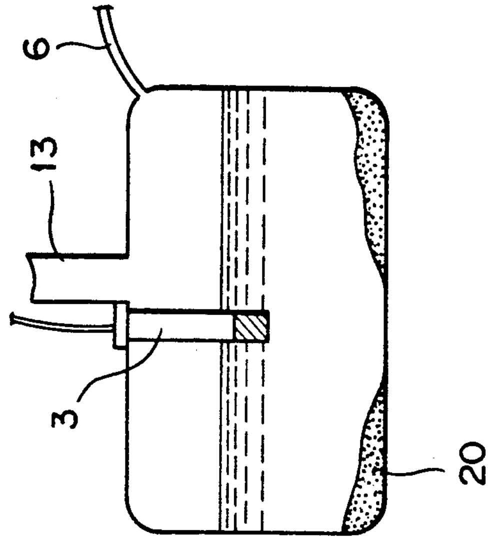
Figure 6:
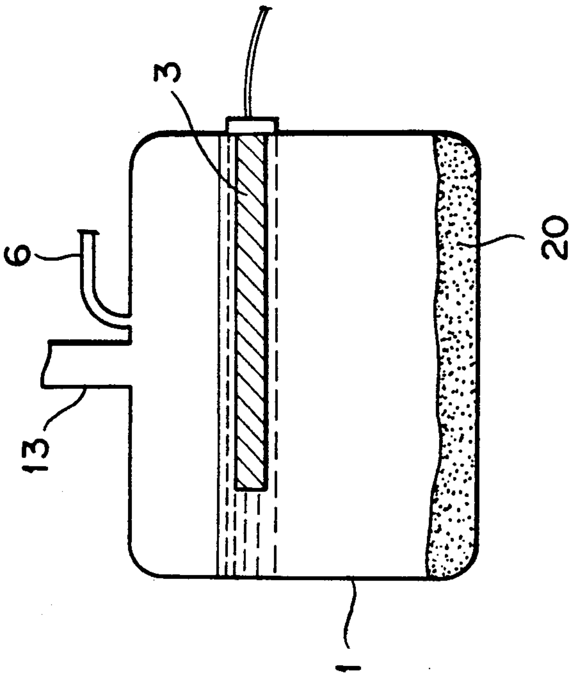
Figure 8:
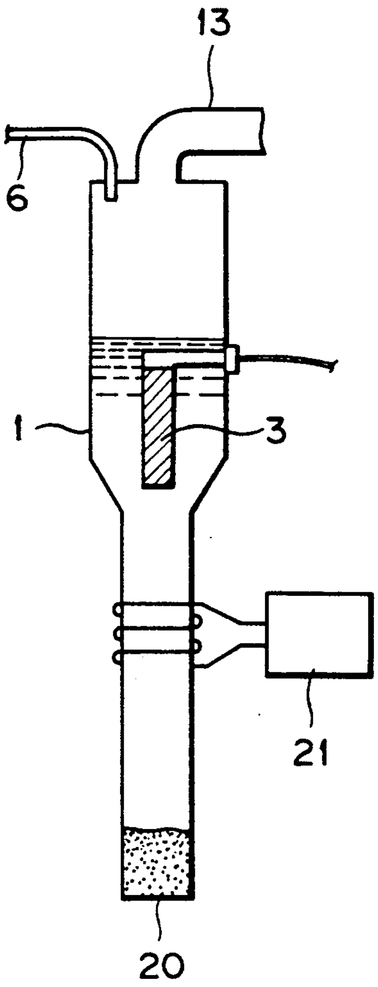

FIG. 3 to FIG. 8 are illustrations showing various types of the shape of the evaporating vessel used in the treatment apparatus of this invention, of which in FIG. 4 and FIG. 5 each, the heating means 3 is mounted on the outside of the evaporating vessel 1. In FIG. 8, a lower part of the evaporating vessel 1 is cooled by a cooler 21.

Figure 10:
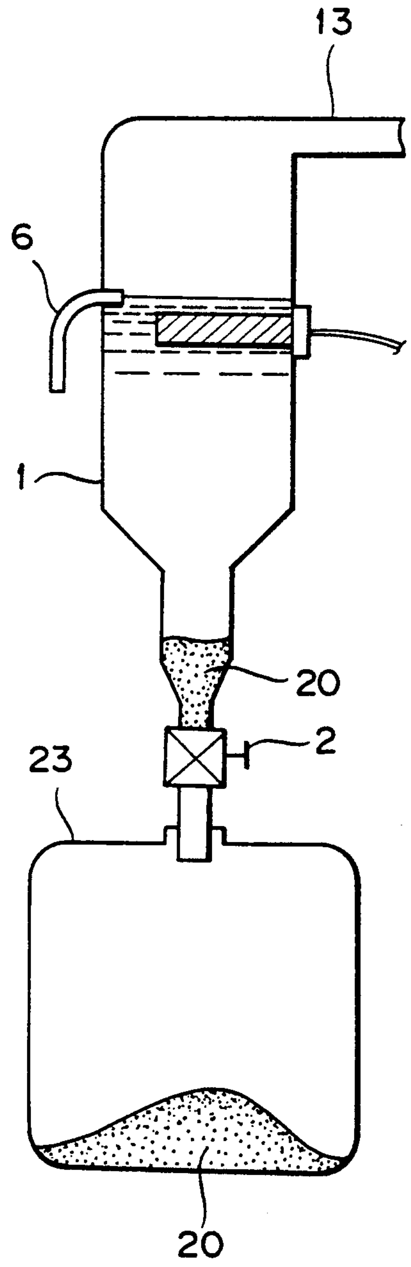
Figure 12:
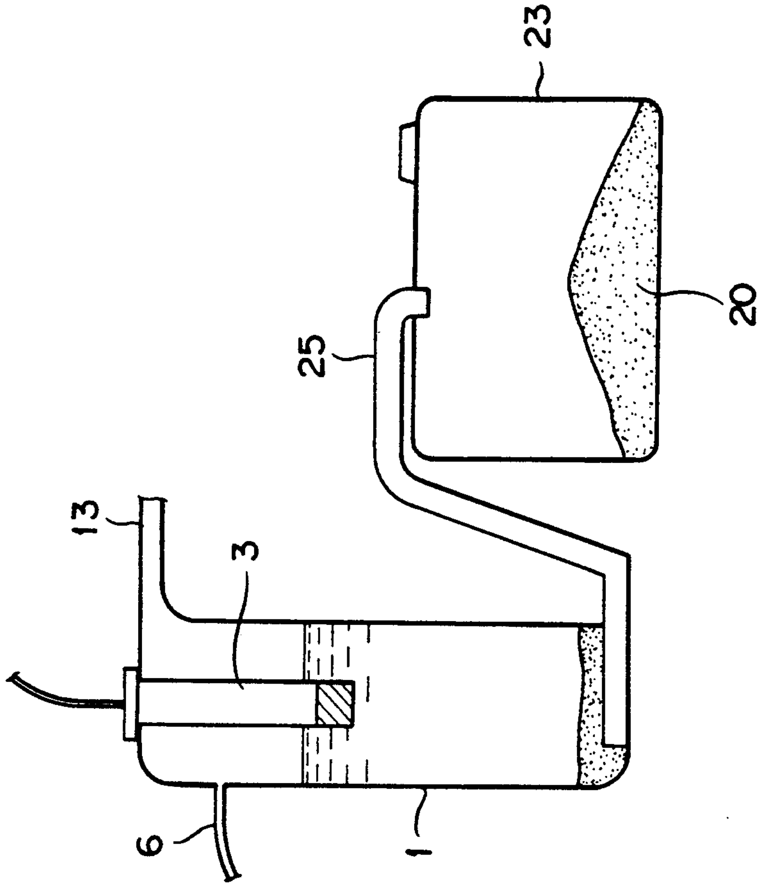
Figure 11:
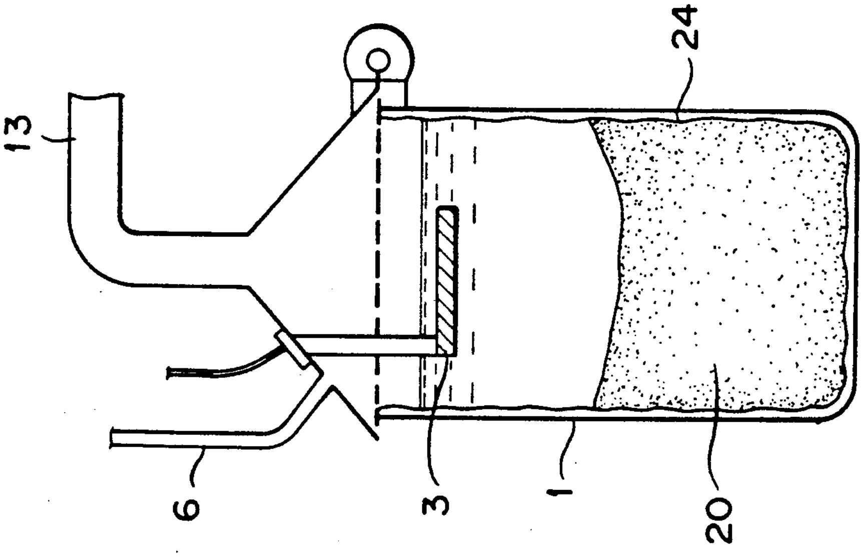

FIG. 9 to FIG. 12 are illustrations showing various manners of taking out the settlings, of which in FIG. 9 the settlings 20 deposited at the bottom part of the evaporating vessel 1 are transported to a settlings-receiving container 29 through means of a slurry pump 22. In FIG. 10, the settlings 20 are allowed to fall by gravity to a settlings-receiving container 23 by opening the ball valve 2. In FIG. 11, a flexible bag 24 is disposed in the evaporating vessel 1, and, after completion of the concentration treatment, the upper part of the evaporating vessel 1 is opened to take out the settlings 20 together with the bag 24. In FIG. 12, the settlings 20 deposited at the bottom part of the evaporating vessel 1 are forwarded to the settlings-receiving container 23 through means of a screw pump 25.

In particular, the system shown in FIG. 9, FIG. 10 and FIG. 12, in which the settlings 20 can be continuously taken out, makes it possible to carry out the concentration by evaporation continuously, and thus can be said to be a very advantageous method.

Test Examples

After imagewise printing on a commercially available color photographic paper, continuous processing was carried out with use of the following processing steps and processing solutions.

| Standard processing steps: | | |
|---|---|---|
| (1) Color developing | 38° C | 3 min. |
| (2) Bleach-fixing | 38° C. | 1 min. 30 sec. |
| (3) Stabilizing | 25° C. to 35° C. | 3 min. |
| (4) Drying | 75° C. to 100° C. | about 2 min. |

| Composition of processing solutions: | |
|---|---|
| [Color developing tank solution] | |
| Benzyl alcohol | 15 ml |
| Ethylene glycol | 15 ml |
| Potassium sulfite | 2.0 g |
| Potassium bromide | 1.3 g |
| Sodium chloride | 0.2 g |
| Potassium carbonate | 24.0 g |
| 3-Methyl-4-amino-N-ethyl-N-(β-methanesulfonamideoethyl)aniline sulfate | 4.5 g |
| Brightening agent (a 4,4'-diaminostilbenedisulfonic acid derivative) | 1.0 g |
| Hydroxylamine sulfate | 3.0 g |
| 1-Hydroxyethylidene-1,1-diphosphonic acid | 0.4 g |
| Hydroxyethyliminodiacetic acid | 5.0 g |
| Magnesium chloride.hexahydrate | 0.7 g |
| Disodium 1,2-dihydroxybenzene-3,5-disulfonate | 0.2 g |
| Made up to 1 liter by adding water, and adjusted to pH 10.20 using potassium hydroxide and sulfuric acid. | |
| [Color developing replenishing solution] | |
| Benzyl alcohol | 20 ml |
| Ethylene glycol | 20 ml |
| Potassium sulfite | 3.0 g |
| Potassium carbonate | 24.0 g |
| Hydroxylamine sulfate | 4.0 g |
| 3-Methyl-4-amino-N-ethyl-N-(β-methanesulfonamideoethyl)aniline sulfate | 6.0 g |
| Brightening agent (a 4,4'-diaminostilbenedisulfonic acid derivative) | 2.5 g |
| 1-Hydroxyethylidene-1,1-diphosphonic acid | 0.5 g |
| Hydroxyethyliminodiacetic acid | 5.0 g |
| Magnesium chloride.hexahydrate | 0.8 g |
| Disodium 1,2-dihydroxybenzene-3,5-disulfonate | 0.3 g |
| Made up to 1 liter by adding water, and adjusted to pH 10.70 using potassium hydroxide and sulfuric acid. | |
| [Bleach-fixing tank solution] | |
| Ethylenediaminetetraacetic acid ferric ammonium dihydrate | 60.0 g |
| Ethylenediaminetetraacetic acid | 3.0 g |
| Ammonium thiosulfate (a 70% solution) | 100 ml |
| Ammonium sulfite (a 40% solution) | 27.5 ml |
| Made up to 1 liter as a whole by adding water, and adjusted to pH 7.1 using potassium carbonate or glacial acetic acid. | |
| [Bleach-fixing replenishing solution A] | |
| Ethylenediaminetetraacetic acid ferric ammonium dihydrate | 260.0 g |
| Potassium carbonate | 42.0 g |
| Made up to 1 liter as a whole by adding water. The pH of this solution is adjusted to 6.7 ± 0.1 with use of acetic acid or ammonia water. | |
| [Bleach-fixing replenishing solution B] | |
| Ammonium thiosulfate (a 70% solution) | 500.0 ml |
| Ammonium sulfite (a 40% solution) | 250.0 ml |
| Ethylenediaminetetraacetic acid | 17.0 g |
| Glacial acetic acid. | 85.0 ml |
| Made up to 1 liter as a whole by adding water. The pH of this solution is adjusted to 5.3 ± 0.1 with use of acetic acid or ammonia water. | |
| [Washing-substitutive stabilizing tank solution and replenishing solution] | |
| Ethylene glycol | 1.0 g |
| 2-Methyl-4-isothiazolin-3-on | 0.20 g |
| 1-Hydroxyethylidene-1,1-diphosphonic acid (a 60% solution) | 1.0 g |
| Ammonia water (a 25% aqueous solution of ammonium hydroxide) | 2.0 g |
| Made up to 1 liter using water, and adjusted to pH using 50% sulfuric acid. | 7.0 |

An automatic processing machine was filled in the tanks with the above color developing tank solution, bleach-fixing tank solution and stabilizing tank solution to carry out a running test while processing a sample of the above commercially available color photographic paper sample and while supplying the above color developing replenishing solution, bleach-fixing replenishing solutions A and B and stabilizing replenishing solution through a bellows pump at intervals of 3 minutes. The amount for replenishing was such that the color developing tank was replenished in an amount of 190 ml, the bleach-fixing tank was replenished in an amount of 50 ml for each of the bleach-fixing replenishing solutions A and B, and the stabilizing tank was replenished with the washing-substitutive stabilizing replenishing solution in an amount of 250 ml, each per 1 $m^2$ of the color photographic paper. The stabilizing tank in the automatic processing machine was comprised of stabilizing tanks comprising a first to third tanks in the direction of the flow of the sample, wherein the replenishing was carried out from the last tank, the solution overflowed from the last tank was flowed into the tank anterior thereto and further the solution overflowed therefrom was flowed into the tank further anterior thereto, taking the multi-tank counter-current system.

The continuous processing was carried out until the total replenishing amount of the washing-substitutive stabilizing solution reaches 3 times of the capacity of the stabilizing tank.

Twenty (20) lit. of photographic process waste liquor in which the three kinds of overflowed solutions obtained by the above processing were mixed was treated with use of the apparatus shown in FIG. 2. Provided that the position for setting the heating means was varied to vary the distance between the heating means and the bottom part of the photographic process waste liquor so that five variations of temperature difference can be prepared in the manner that the difference between the temperature of the photographic process waste liquor in the vicinity of the heated part and the temperature at the bottom part of the photographic process waste liquor is varied as shown in Table 1.

In the present Example, the concentration by evaporation is carried out by opening the ball valve 2, and therefore the settlings-holding section 1*b* functions as part of the evaporating vessel 1.

Figure 14:
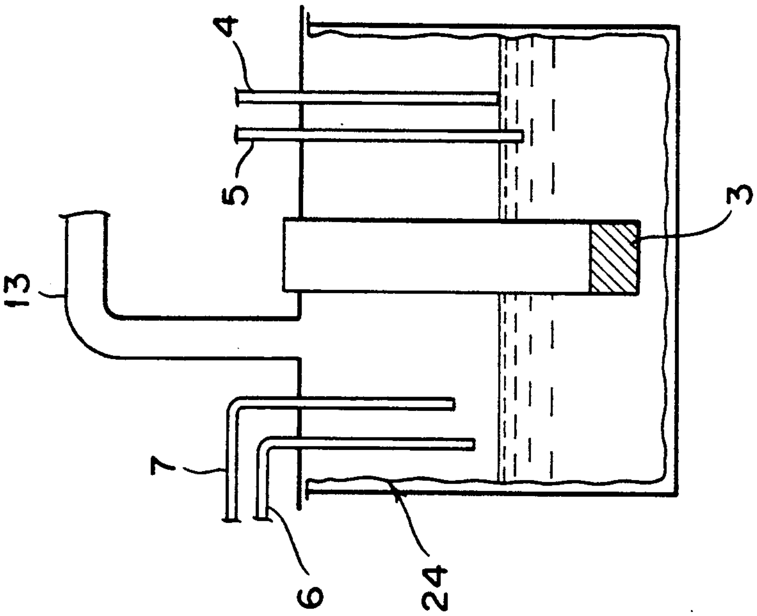
FIG. 14 is a schematic illustration showing a comparative example.

A comparative treatment apparatus (treatment apparatus F) is also shown in FIG. 14, wherein the heating means 3 reaches the vicinity of the bottom part of the evaporating vessel 1, and, after completion of the concentration, the upper part is open to remove the concentrate to the outside of the evaporating vessel 1 together with the bag 24. Only the evaporating vessel 1 is shown in FIG. 14, but the construction other than the evaporating vessel 1 was made to be the same as that of FIG. 2. In treatment apparatus F, the temperature difference between the heating means 3 and the bottom part of the evaporating vessel 1 was found to be 3° C. or less as a result of a preliminary test.

The capacity of the evaporating vessel 1 at the position lower than the lower limit liquid level sensor 5 was made to be 1.5 lit. in every case, provided that, in treatment apparatus A to E of this invention, the corresponding capacity was made to be 1.5 lit. including the capacity of the settlings-holding section 1*b*. The heating means 3 was made to have a heat capacity of 1.5 kW in every case.

The process of evaporation according to treatment apparatus A to F was observed, and the state of how bumping takes place as the concentration proceeds is set out in Table 1. The time until the evaporation treatment is completed is also measured and set out in Table 1.

In Table 1, also set out are results obtained by detecting the gas (ammonia and hydrogen sulfide) on the liquid surface of the condensate water in the condensate water tank 18, observed when the photographic process waste liquor in the waste liquor tank 9 was reduced to 1 lit.

TABLE 1

| Treatment apparatus | Temperature difference | Stage at which bumping begins *1 | Time required (hour) | Ammonia gas (ppm) | Hydrogen sulfide gas ppm |
|---|---|---|---|---|---|
| A | 5° C. | 6.5 l | 11.5 | 50 | 15 |
| B | 10° C. | 5 l | 11 | 20 | 10 |
| C | 30° C. | 2 l | 10 | 10 | 5 |
| D | 40° C. | 0.5 l | 9 | 5 | 2 |
| E | 50° C. | No bumping | 8 | 0 | 0 |
| F | 3° C. | 8 l | 13 | 100 | 30 |

*1: Indicated in terms of the quantity of the waste liquor remained in the waste liquor tank 9.

As will be clear from Table 1, it is understood that in treatment apparatus A to E of this invention, the bumping may not readily take place, the time required until the evaporation is completed is short, and the gass may be generated in less amount, as compared with comparative treatment apparatus F. In particular, good results are obtained when the difference between the temperature of the photographic process waste liquor in the vicinity of the heated part and the temperature at the bottom part of the photographic process waste liquor is 5° C. or ore, and the better, the greater the temperature difference is.

The residues obtained after treatment by treatment apparatus F were in the form of sludge concentrated to the degree of 1/13 to 1/14, but the sludge obtained by treatment apparatus A to E was concentrated to a higher degree of 1/20 of the initial waste liquor. Particularly in treatment apparatus E, the settlings were found to be concentrated to 1/30 or more.

Also, the settlings-holding section had so low temperature in each of treatment apparatus A to E that it was possible to detach it in 1 hour, or, particularly in treatment apparatus E, immediately. However, in treatment apparatus F, it was impossible to take away the bag before it was allowed to stand overnight.

Similar tests were also repeated by changing to 1.0 lit. the capacity of the evaporating vessel at the position lower than the lower limit liquid level sensor. However, in treatment apparatus F, the waste liquor in the evaporating vessel was solidified at the time the waste liquor remained in the waste liquor tank was reduced to 5 lit., and any further concentration could not be effected. In contrast thereto, in treatment apparatus A to E, no solidification took place and the concentration was able to be effected to the last.

As described in the above, this invention comprises heating an upper part of photographic process waste liquor to concentrate by evaporation the photographic process waste liquor in such a manner that the difference between the temperature of the photographic process waste liquor in the vicinity of the heated part and the temperature at a bottom part of the photographic process waste liquor may become 5° C. or more, and causing a solute in the photographic process waste liquor to settle. Accordingly, the harmful or ill-smelled components generated by evaporation treatment of photographic process waste liquor can be decreased and there may occur no concentration at the evaporating section even if a concentration treatment is continuously carried out, thus hardly causing any accidents such as bumping. Also, there can be achieved good thermal efficiency, can be achieved good evaporation efficiency, can be reduced energy cost, can be made an apparatus compact, may be caused less bumping at the time of the evaporation treatment, and moreover can be achieved a very great concentration degree of the residues concentrated to dryness by the evaporation, and may be given only a small amount of water contained in wastes (sludge), thus being easy to handle.

What is claimed is:

1. A method of treating photographic process waste liquor through concentration by evaporation, consisting essentially of the steps:

(a) supplying waste liquor to an evaporating vessel;

(b) evaporating liquid from photographic process waste liquor by heating directly an upper part of the photographic process waste liquor with a heating means immersed in the liquor;

(c) maintaining at least a 5° C. differential between the temperature of the photographic process waste liquor in the heated upper part of the waste liquor and the temperature at a bottom part of the photographic process waste liquor thereby concentrating the photographic waste liquor whereby solute precipitates;

(d) allowing solute which precipitates from the photographic process waste liquor to settle toward said bottom part;

(e) collecting the solute in a settling-depositing chamber from the bottom part of the waste liquor; and (f) removing the solute from the settings depositing chamber thereby to restrain formation of noxious gases.

2. The method according to claim 1, wherein the difference between the temperature of the photographic process waste liquor in the vicinity of the heated part and the temperature at a bottom part of the photographic process waste liquor is at least 10° C.

3. The method of claim 1, wherein additional photographic process waste liquor to be treated is continuously fed depending on a decrease in the volume of the photographic process waste liquor being treated.

4. The method of claim 1, wherein additional photographic process waste liquor to be treated is intermittently fed depending on a decrease in the volume of the photographic process waste liquor being treated.

5. The method of claim 1 further consisting essentially of an amount of waste liquor and supplying more waste liquor to be evaporated in response to a predetermined detected amount.

* * * * *